United States Patent [19]

Meehleder

[11] Patent Number: 5,040,360
[45] Date of Patent: Aug. 20, 1991

[54] MOTORIZED LAWN MOWER SYSTEM WITH A BELT DRIVEN RAISEABLE AND LOWERABLE TRIMMING CORD DEVICE WHICH IS RAISEABLE FROM AN EXTENDED HORIZONTAL OPERATING POSITION TO A RAISED INBOARD POSITION

[76] Inventor: John C. Meehleder, 5325 Sherman St., Saginaw, Mich. 48604

[21] Appl. No.: 541,018

[22] Filed: Jun. 20, 1990

[51] Int. Cl.$^5$ ............................................. A01D 34/28
[52] U.S. Cl. ...................................... 56/11.6; 56/13.7; 56/15.2
[58] Field of Search ...................... 56/11.6, 13.6, 13.7, 56/15.2, 17.5

[56] References Cited

U.S. PATENT DOCUMENTS

| 4,896,488 | 1/1990 | Duncan et al. | 56/13.7 |
| 4,949,536 | 8/1990 | Neufeld | 56/13.7 |

FOREIGN PATENT DOCUMENTS

| 244666 | 5/1965 | Austria | 56/13.7 |

Primary Examiner—William P. Neuder
Attorney, Agent, or Firm—Learman & McCulloch

[57] ABSTRACT

A motorized lawn mowing machine supported on wheels has a generally horizontal deck with a spindle mounted grass cutter blade below the deck which is rotatable in a generally horizontal cutting plane to cut grass as the machine moves in a forward path of travel. A drive spindle driven by the lawn mower engine protrudes above the deck and mounts a first pulley. Mounted on the deck for swinging movement between an extended operative position in which it extends forwardly and sidewisely angularly from said deck and a vertically raised inboard inoperative position is an auxiliary support having a vertically disposed spindle near its front end with a second pulley thereon. A rotary trimmer disc with flailing cords is mounted on the spindle to rotate in a horizontal plane. An endless drive member is trained around the first and second pulleys and power driven mechanism is connected between the deck and auxiliary support for selectively moving the auxiliary support between operative extended position and an inoperative vertically raised folded position in which the endless member automatically disengages.

9 Claims, 2 Drawing Sheets

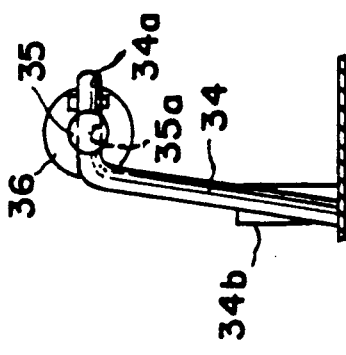
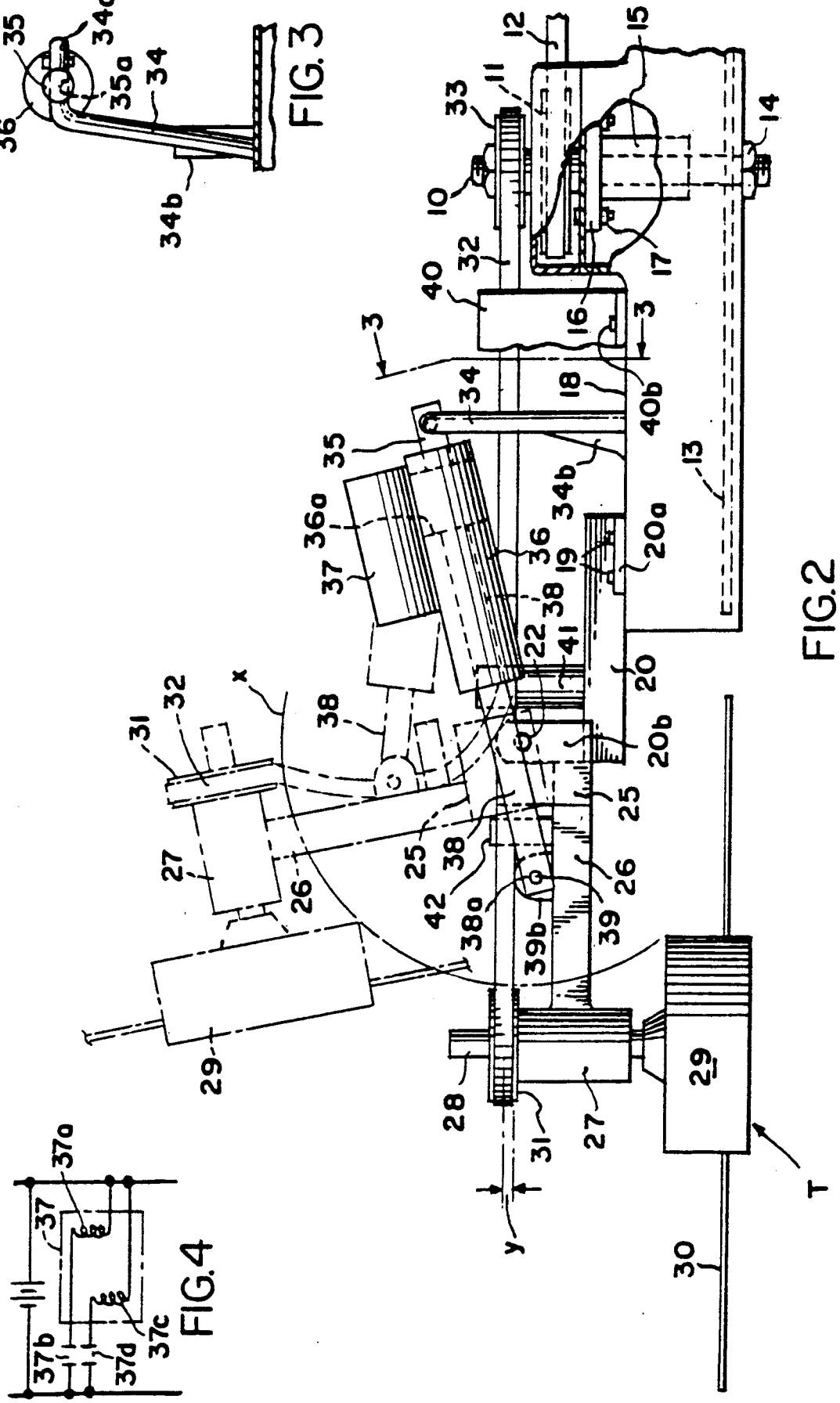
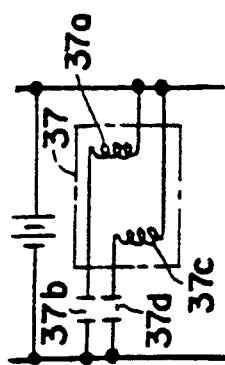

MOTORIZED LAWN MOWER SYSTEM WITH A BELT DRIVEN RAISEABLE AND LOWERABLE TRIMMING CORD DEVICE WHICH IS RAISEABLE FROM AN EXTENDED HORIZONTAL OPERATING POSITION TO A RAISED INBOARD POSITION

FIELD OF THE INVENTION

This invention relates to trimmer attachments for rotary lawn mowers and more particularly to attachments driven by the rotary lawn mower engine for trimming grass adjacent to fixed objects such as fences, trees and monuments which the main blade or blades of the lawn mower must avoid.

BACKGROUND OF THE INVENTION

Various attachments for conventional lawn mowers and the like are known and exemplified in the following patents:

| | |
|---|---|
| 3,236,037 | Porterfield |
| 3,531,922 | Hansen |
| 3,782,085 | Parker et al |
| 4,170,099 | Owens |
| 4,453,372 | Remer |

Some of these patents, such as the Owens U.S. Pat. No. 4,170,099, show a vertically disposed, flailing disc which can be raised to an inoperative position, but its drive depends on the presence of a horizontal flailing disc which cannot be raised. In the Remer U.S. Pat. No. 4,453,372 a flexible, cable type drive is used to drive the edger or trimmer, which is movable from an operating position to a disengaged position on a multi-positional boom via a ball and socket mounting arrangement.

SUMMARY OF THE INVENTION

One of the prime objects of the present invention is to design a relatively simple and economic horizontal flailing disc attachment which can be belt driven from the drive spindle of the horizontal cutting disc blades or one of them, when in position, while at the same time providing mechanism which permits the belt to be folded without suffering the loss of its trained position around the ends of the pulleys, when these pulleys move out of planar relationship.

Another object of the invention is to provide a drive system of the type described wherein the attachment is automatically engaged and disengaged while the mower engine is running, via movement of the attachment between outboard operative and inboard stored positions.

A further object of the invention is to provide an improved trimmer attachment for a rotary lawn mower which can be readily mounted thereon, and which is light weight, yet rugged, in construction.

Another object of the invention is to provide a trimmer attachment which is relatively safe to operate around obstructions in that it makes use of cord type flailing cords rather than sharp and rigid cutter blades.

The system to be described in detail hereinafter includes a conventional gasoline or otherwise powered rotary lawn mower having a generally horizontal deck with at least one vertically disposed drive spindle on which conventional horizontal grass cutting blades are mounted below the deck. The so-called blade drive spindle which is driven by the lawn mower engine is provided with a pulley on which a drive belt can be mounted. An auxiliary support is mounted on the deck for movement between an extended outboard position in which it extends forwardly and sidewisely angularly from the deck, and a vertically raised sidewisely inboard position. The auxiliary support also mounts a vertically disposed spindle near its front end and has a pulley thereon which is in the same plane as the drive spindle pulley when the auxilitary support is in operative outboard position. Mounted on the lower end of the auxiliary support drive spindle is a rotary trimmer disc having circumferentially spaced flailing trimmer cords which are of a length such that they sidewisely lap the path of the blades as the blades travel forwardly without, however, engaging the blades or the deck.

Other objects and advantages of the invention will become apparent with reference to the accompanying drawings and the accompanying descriptive matter.

IN THE DRAWING

FIG. 2 is a fragmentary, side elevational view thereof taken in the line 2—2 of FIG. 1, the chain lines indicating the raised position of the trimming attachment;

FIG. 3 is a fragmentary, sectional, elevational view, taken on the line 3—3 of FIG. 2 and illustrating the manner of mounting the trimming mechanism raising member; and FIG. 4 is a schematic electrical circuit.

Figure 1:
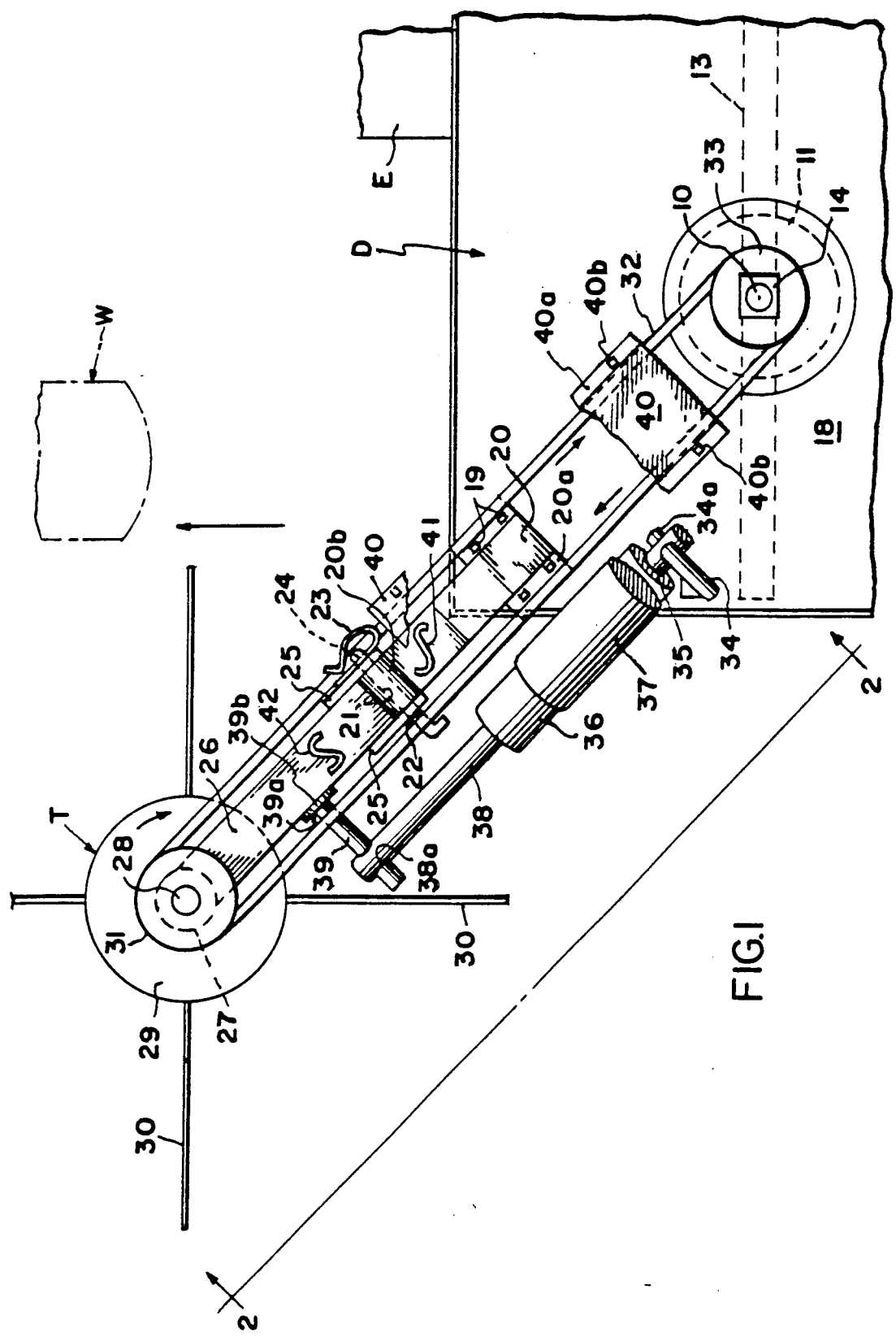
FIG. 1 is a top plan view, with the trimming disc shown in lowered operative position.

Referring now more particularly to the accompanying drawings, in FIG. 1, I have shown a portion of the deck generally designated D of a conventional riding lawn mower which includes front and rear pairs of wheels, a front one of which is designated at W. It is to be emphasized that the lawn mower on which the mechanism is mounted is conventional in character and includes a gasoline-powered, internal combustion engine for driving the rotary lawn mower blades, which are mounted on shafts such as shown at 10, below the deck D, to rotate in a horizontal plane. Only one such blade system is shown in the drawing, but it is to be understood that a typical deck D may house a series of three such blades, mounted on three such shafts 10, to cut a swath of grass of considerable width. The internal combustion engine E, which is used is shown only diagrammatically, but drives each of the shafts 10 which the lawn mower provides in the usual manner. For purposes of the present application, it will be sufficient to note that shaft 10 (see FIG. 2) mounts a pulley 11 around which a belt 12 is trained to transmit the drive of the lawn mower engine E to shaft 10.

It is important to note that the lawn mower cutting blade 13, which is fixed on the lower end of shaft 10, is of sufficient length to cut an area slightly laterally outboard of the path of travel of the aligned front and rear wheels W on the side of the lawn mower shown. Blade 13 is releaseably held in position by a nut 14 which is received on the threaded end of shaft 10. Shaft 10 is supported for rotary travel in a quill 15 provided with appropriate bearings and having a flange portion 16 which can be bolted as at 17 to the top wall or roof 18 of the deck D.

Provided on the front corner of the deck D and bolted to the top of the deck 18 as at 19, is a angularly extending mounting support or bracket 20 having side flange portions 20a which facilitate its bolting to the deck top 18. The angular bracket 20 includes an upstanding leg 20b, which has a pivot opening 21 for receiving a pivot pin 22 which can be secured in place by a cotter pin 23 extending through an appropriate opening 24 in one end of pin 22. The pin also extends through a pair of upstanding plates 25 fixed to an extension support 26 on which the trimming attachment generally designated T is mounted for rotation. The plates 25 similarly have openings to rotatably receive the pin 22. Supported on the outer end of the extension support 26 is a quill 27 including bearings for supporting a shaft 28 extending perpendicularly to the support 26. Shaft 28 supports the trimming attachment T, which includes a trimmer head or hub 29 from which laterally extend flexible trimmer or flailing cords 30 which are of a replaceable nature. Such trimming attachments T are commercially obtainable and well known.

Fixed on the upper end of shaft or spindle 28 is a pulley 31 around which an endless drive belt 32 is trained. Belt 32 is trained at its inner end around a pulley 33 fixed on the upper end of blade shaft 10. It is important to note as shown in FIG. 1, that the rotary path of trimmer cords 30 is maintained sufficiently in advance and laterally of the path of blade 13 such that the paths trimmed by the cords 30 and cut by the blade 13 laterally overlap without, however, intersecting. It is for this reason that the supports 20 and 26 extend at a predetermined angle laterally outwardly and forwardly, to position the trimmer device T so that the cords 30 do not, in their path of rotation, engage the wheel W.

As will become apparent, the position of pivot pin 22 with respect to the horizontal portions of supports 20 and 26 is critical. As indicated previously the trimming attachment is used for trimming around permanently fixed objects and, when the lawn mower is cutting the main body portions of lawns and the like which do not require use of the trimming attachment T, it is desirable that the trimming attachment be inoperative. Thus it is considered advantageous to raise it to an inoperative position, out of harms way, in which it is automatically disengaged from the source of power. Mounted on the deck top wall 18 is an angular support 34 having a bearing leg 34a which extends through opening 35a in a support 35 provided for an electro mechanical linear actuator 36. Support 34 is braced by reinforcement 34b. Such actuators 36 are commercially available and comprise essentially ball nut and screw devices of well known character. When the nut 36a of such devices is revolved by an electric motor 37, the screw 38 extends or retracts axially, depending on the direction of rotation of the nut. In FIG. 4 I have shown the forwarding circuit 37a of motor 37 in series with switch contacts 37b and the retracting (reversing) circuit 37a of motor 37 in series with switch contacts 37d. A toggle switch handy to the operator of the lawn mower can operate contacts 37b and 37d. At its outer end, ball screw 38 has an opening 38a to receive a lateral post 39, which is welded as at 39a to an ear 39b upstanding from and fixed to extension plate 26.

THE OPERATION

When the trimming attachment T is raised, via retraction of the ball screw 38, to travel in the arc x shown in FIG. 2, the belt 32, in effect, folds at the location of pin 21 intermediate the length of the belt. It must not, however, leave the pulleys 31 and 33, but must slacken only sufficiently so that no drive is transmitted to the belt by pulley 33. When the belt 32 is folded its overall length tends to be shortened because it's tendency is to spread laterally at its mid portions. The arc of travel is such, however, that it will not remove itself from the pulleys. As a safety precaution, a U-shaped guard 40, with flange portions 40a which bolt to the deck 18 as at 40b, can extend just short of the portions 20a of the support 20 to vertically contain the laterally inner portion of the belt. A similar safety guard can be mounted on support 26 to move with it. To safeguard against undue lateral twisting of the belt an S-shaped guard 41 is provided on the support 20, and a S-shaped guard 42 is further provided on the support 26 to prevent any tendency of the longitudinal runs of belt 32 from whipping and crossing over as the drive is removed from the belt.

Once the pulley 31 is raised to the chain line position shown in FIG. 2, no drive is transmitted by the belt 32 which is slack around the pulley 31, and at its opposite end around pulley 33. It is important that the supports 20 and 26 accommodate to existing riding lawn mowers and mount to the decks thereof in a manner to suspend the trimming attachment T at a level such as to horizontally conform to blades 13. For rigidity reasons, it is desired that the extension support 26 be fixed to the quill 27 substantially vertically intermediate the ends of the quill 27 to provide the required stability when the device is operating, and prevent whipping of the head 29 and the cords 30 when weeds of considerable size i.e., an inch in diameter, are encountered.

It will be noted that the pivot pin 21 is disposed above the horizontal level of extension 26, and disposed a distance y below pulley 31, measuring from the horizontal centerline of the pulley to the horizontal centerline of pin 22. Typically, this distance is 1⅜ inches and it is adequate to provide for slackening of the belt when the belt is raised to stored inoperative position, while at the same time functioning to automatically lengthen the belt to a taut condition around pulleys 31 and 33, when the support 26 is swung down to the lowered operative position. The distance y is critical to tightening the belt to properly drive, when the device is swung to lowermost position, but still must not unduly loosen the belt and cause it to whip when the support arm 26 is raising to stored position. It is desired that the distance y be such that, when the pulley 31 is swung upwardly the belts loosens only sufficiently so that pulleys 31 and 33 are not in driving engagement with the belt, and this is accomplished by disposition of the pin 22 in the position shown. If the pin 29 were in horizontal alignment with the pulley 31, the belt would not effectively decrease in overall length and slacken around the pulleys 31 and 33. If the pin 22 were disposed above the level of pulley 31, then the belt 26 would tend to elongate and undesirably tighten, as the pulley 31 moved upwardly in its arc. Accordingly, pin 22 should be at a distance slightly below the centerline of pulley 31, but not so far below it as to unduly slacken the belt as pulley 31 moves upwardly. With the distance y disposition, the guard 40 is employed only as a safety measure, and the control of the belt is a function of proper location of pin 22. The effective shortening of the belt which occurs when the trimming attachment is moved to stored position should be substantially the thickness of the belt used. When employing a ½ inch belt, then the distance y should be substantially 2.74 times the thickness of the belt.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

I claim:

1. In a motorized lawn mowing machine supported on wheels and having a generally horizontal deck housing motor-driven spindle mechanism with at least one vertically disposed drive spindle protruding above said deck, said spindle mechanism having grass cutter blade mechanism thereon below said deck, and rotatable in a generally horizontal cutting plane at a predetermined level above the ground to cut grass in a first longitudinal path of a width determined by the extent of the cutter blade mechanism as the machine moves in a forward path of travel, the improvement wherein:
   a. a first pulley is mounted on said spindle;
   b. an auxiliary support mounted on said deck for travel between an operative position in which it extends forwardly and sidewisely angularly from said deck and a vertically raised inboard inoperative position, said auxiliary support having a vertically disposed, second spindle near its front end;
   c. a rotary trimmer disc having circumferentially spaced, flailing trimmer cords mounted on said second spindle, radially generally opposite said blade mechanism at a predetermined level above the ground to cut grass and weeds in a second longitudinal path determined by the length of the cords as the machine moves in a forward path of travel, said cords being of a length such that said first and second paths of travel sidewisely lap without the cords contacting the said blade mechanism or deck.
   d. a second pulley mounted on said second spindle on the auxiliary support;
   e. an endless drive belt trained around said first and second pulleys;
   f. horizontally extending pivot means, supported by said deck under said endless member, mounting said auxiliary support for said travel between operative and inoperative positions in a generally vertical path; said pivot means being so located with respect to said second pulley as to slack the belt with upward folding of said belt as the auxiliary support moves to raised position and to render the belt taut to resume a drive relationship with said pulleys when said auxiliary support is restored to operative position; and
   g. power driven means connected between said deck and auxiliary support for selectively moving said auxiliary support between operative extended position and inoperative vertically raised position.

2. The machine of claim 1 wherein said trimmer disc and blade mechanism are driven in a direction of rotation such that grass and weeds cut by said cords are fed sidewisely inwardly into the path of said blade mechanism where they are further cut and shredded by said blade mechanism.

3. The machine of claim 1 wherein said disc and blade mechanism are driven clockwisely as viewed in plan.

4. The machine of claim 1 wherein said pivot means is disposed a predetermined distance below said second pulley generally midway between said pulleys.

5. In a motorized lawn mowing machine supported on wheels and having a generally horizontal deck with at least one vertically disposed drive spindle, having grass cutter blade mechanism thereon below said deck, and rotatable in a generally horizontal cutting plane at a predetermined level above the ground to cut grass in a first longitudinal path of a width determined by the extent of the cutter blade mechanism as the machine moves in a forward path of travel, the improvement wherein;
   a. said drive spindle protrudes above said deck;
   b. a first pulley is mounted on said spindle;
   c. an auxiliary support is mounted on said deck for movement between an extended operative position in which it extends forwardly and sidewisely angularly from said deck and a vertically raised inboard inoperative position, said auxiliary support having a vertically disposed second spindle near its front end;
   d. a rotary trimmer disc having circumferentially spaced, flailing trimmer cords mounted on said second spindle, radially generally opposite said blade mechanism at a predetermined level above the ground to cut grass and weeds in a second longitudinal path determined by the length of the cords as the machine moves in a forward path of travel, said cords being of a length such that said first and second paths of travel sidewisely lap without the cords contacting the said blade mechanism or deck.
   e. a second pulley mounted on said second spindle on the auxiliary support;
   f. an endless drive member trained around said first and second pulleys;
   g. horizontally extending pivot means supported by said deck mounting said auxiliary support for travel in a vertical path;
   h. said endless member slacking to automatically cease driving but remaining in generally planar alignment with the pulleys around which it is trained with upward folding of said endless member as the auxiliary support moves to raised position; and
   i. power driven means connected between said deck and auxiliary support for selectively moving said auxiliary support between operative extended position and inoperative vertically raised position.

6. In a method of operating edge trimming flailing mechanism mounted on a wheeled motorized lawn mowing machine having a generally horizontal deck with spindle mechanism having at least one vertically disposed drive spindle protruding above said deck, the spindle mechanism having grass cutter blade mechanism thereon below said deck which is rotatable in a generally horizontal cutting plane at a predetermined level above the ground to cut grass in a first longitudinal path of a width determined by the extent of the cutter blade mechanism as the machine moves in a forward path of travel, the machine further having a first pulley mounted on said spindle; an auxiliary support mounted on said deck for movement between an operative position in which it extends forwardly and sidewisely angularly from said deck and a vertically raised inboard inoperative position, said auxiliary support having a vertically disposed second spindle near its front end; a rotary trimmer disc having circumferentially spaced, flailing trimmer cords mounted on said second spindle, radially generally opposite said blade mechanism at a predetermined level above the ground to cut grass and weeds in a second longitudinal path determined by the length of the cords as the machine moves in a forward path of travel, said cords being of a length such that said first and second paths of travel sidewisely lap without the cords contacting the said blade mechanism or deck, a second pulley mounted on said second spindle on the auxiliary support; an endless drive belt trained around said first and second pulleys; horizontally extending pivot means supported by said deck under said endless member mounting said auxiliary support for travel in a vertical path; said pivot means being so located with respect to said second pulley as to tend to maintain the end positions of said endless member in generally planar alignment with the pulleys around which they are trained despite upward folding of said endless member which folds and slacks the belt as the auxiliary support moves to raised position and to render the belt taut to resume a drive relationship with said pulley when the auxiliary support is restored to operative position; and manipulatable means connected between said deck and auxiliary support for selectively moving said auxiliary support between operative extended position and an inoperative vertically raised position, the steps of:

a. trimming edge grass adjacent an obstacle by rotating said second pulley and flailing cords and while cutting an intersecting swath of grass with said blade mechanism;

b. operating said manipulatable means to swing said auxiliary support upwardly and fold said belt intermediate its length, the arc of swing being such as to slack said belt only substantially as required to automatically disengage the ends of the belt from driving engagement with said pulleys; and c. swinging said auxiliary support and belt downwardly and automatically restoring said belt to a taut condition in driving engagement with said pulleys.

7. The machine of claim 1 wherein said trimmer disc and blade mechanism are driven in a direction of rotation such that grass and weeds cut by said cords are fed sidewisely inwardly into the path of said blade mechanism where they are further cut and shredded by said blade mechanism.

8. The machine of claim 1 wherein said disc and blade mechanism are driven clockwisely as viewed in plan.

9. In a motorized lawn mowing machine supported on wheels and having a generally horizontal deck with at least one vertically disposed drive spindle, having grass cutter blade mechanism thereon below said deck, and rotatable in a generally horizontal cutting plane at a predetermined level above the ground to cut grass in a first longitudinal path of a width determined by the extent of the cutter blade mechanism as the machine moves in a forward path of travel, the improvement wherein;

a. a first pulley is mounted on said spindle;

b. an auxiliary support is mounted on said deck for movement between an extended operative position in which it extends from said deck and a vertically raised, inboard, inoperative position, said auxiliary support having a vertically disposed second spindle near its front end;

c. a rotary trimmer disc having circumferentially spaced, flailing trimmer cords mounted on said second spindle, radially generally opposite said blade mechanism at a predetermined level above the ground to cut grass and weeds in a second longitudinal path determined by the length of the cords as the machine moves in a forward path of travel, said cords being of a length such that said first and second paths of travel sidewisely lap without the cords contacting the said blade mechanism or deck.

d. a second pulley mounted on said spindle on the auxiliary support;

e. an endless drive member trained around said first and second pulleys;

f. pivot means supported by said deck mounting said auxiliary support for travel in a vertical path;

g. said endless member slacking to automatically cease driving but remaining in generally alignment with the pulleys around which it si trained with upward folding of said endless member as the auxiliary support moves to raised position; and h. manipulatable means connected to selectively position said auxiliary support in operative extended position and in inoperative vertically raised position.

* * * * *

UNITED STATES PATENT AND TRADEMARK OFFICE
CERTIFICATE OF CORRECTION

PATENT NO. : 5,040,360

DATED : August 20, 1991

INVENTOR(S) : John C. Meehleder

It is certified that error appears in the above-identified patent and that said Letters Patent is hereby corrected as shown below:

Column 8, line 37, change "si" to -- is --.

Signed and Sealed this

Sixth Day of October, 1992

*Attest:*

DOUGLAS B. COMER

*Attesting Officer*  Acting Commissioner of Patents and Trademarks